(12) United States Patent
Hu et al.

(10) Patent No.: US 10,764,394 B2
(45) Date of Patent: Sep. 1, 2020

(54) RESOURCE BASED FRAMEWORK TO SUPPORT SERVICE PROGRAMMABILITY FOR A 5G OR OTHER NEXT GENERATION MOBILE CORE NETWORK

(71) Applicant: AT&T INTELLECTUAL PROPERTY I, L.P., Atlanta, GA (US)

(72) Inventors: Qingmin Hu, Sammamish, WA (US); Brian Daly, Peachtree Corners, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 110 days.

(21) Appl. No.: 15/365,905

(22) Filed: Nov. 30, 2016

(65) Prior Publication Data

US 2018/0152452 A1    May 31, 2018

(51) Int. Cl.
*H04L 29/06* (2006.01)
*H04L 29/08* (2006.01)
(Continued)

(52) U.S. Cl.
CPC ............. *H04L 67/32* (2013.01); *H04W 12/06* (2013.01); *H04W 12/08* (2013.01)

(58) Field of Classification Search
CPC ...... H04L 41/12; H04L 41/5051; H04L 41/00; H04L 41/0806; H04L 41/0896; H04L 41/5041; H04L 41/14; H04L 41/20; H04L 41/5048; H04L 41/5054; H04L 41/5087; H04L 43/04; H04L 43/0817; H04L 43/0823; H04L 45/02; H04L 47/748; H04L 47/782; H04L 47/822; H04L 63/1408; H04L 63/1441; H04L 63/20; H04L 67/02; H04L 67/10; H04L 67/16; H04L 67/18;
(Continued)

(56) References Cited

U.S. PATENT DOCUMENTS 8,738,688 B2 * 5/2014 Myers .................... H04L 67/34
709/203
8,798,579 B2 * 8/2014 Hickie ................. G06F 21/604
455/410

(Continued)

FOREIGN PATENT DOCUMENTS

WO   WO-2017147751 A1 * 9/2017 ............ H04W 76/12

OTHER PUBLICATIONS

Sánchez, José, et al. "Softwarized 5G networks resiliency with self-healing."5G for Ubiquitous Connectivity (5GU), 2014 1st International Conference on. IEEE, 2014. 5 pages.
(Continued)

*Primary Examiner* — Joseph P Hirl
*Assistant Examiner* — Ka Shan Choy
(74) *Attorney, Agent, or Firm* — Amin, Turocy & Watson, LLP

(57) ABSTRACT

A programmable network architecture that employs a software based, modular functional infrastructure with standard interfaces is utilized for mobile core networks. In one aspect, network services and/or functions can be built and addressed as resources that are configured and/or accessed with standard and/or open application program interfaces (APIs). The disclosed network architecture provides real-time and on-demand network configurations and dynamic service provisioning.

20 Claims, 10 Drawing Sheets

(51) Int. Cl.
*H04W 12/08* (2009.01)
*H04W 12/06* (2009.01)

(58) Field of Classification Search
CPC ......... H04L 69/321; G06F 2009/45595; G06F 9/45558; G06F 9/50; G06F 2009/45562; G06F 2009/4557; G06F 9/45533; G06F 9/45537; G06F 9/5077; H04W 36/0033; H04W 36/0072; H04W 36/12; H04W 40/248; H04W 40/32; H04W 4/005; H04W 4/70; H04W 76/10; H04W 76/14; H04W 88/16; H04W 8/065; H04W 63/10; H04W 63/08; H04W 67/32
See application file for complete search history.

(56) References Cited

U.S. PATENT DOCUMENTS

| | | | | |
|---|---|---|---|---|
| 8,880,701 B2* | 11/2014 | Shin | ......................... | H04L 67/34 709/226 |
| 9,384,028 B1 | 7/2016 | Felstaine et al. | | |
| 9,438,665 B1* | 9/2016 | Vasanth | .................. | H04L 67/10 |
| 9,491,683 B2* | 11/2016 | Hu | ....................... | H04W 40/246 |
| 9,584,482 B2 | 2/2017 | Burns | ..................... | H04L 12/66 |
| 9,729,506 B2* | 8/2017 | Call | ......................... | H04L 63/02 |
| 9,973,375 B2* | 5/2018 | Shatzkamer | ............ | H04L 41/04 |
| 9,973,549 B2* | 5/2018 | Maria | ................. | H04L 65/1083 |
| 10,019,599 B1* | 7/2018 | Moran | .................. | G06F 21/121 |
| 2010/0332615 A1* | 12/2010 | Short | ....................... | H04L 63/08 709/217 |
| 2014/0130134 A1* | 5/2014 | Arora | ..................... | G06F 21/629 726/4 |
| 2014/0317261 A1* | 10/2014 | Shatzkamer | ............ | G06F 9/455 709/223 |
| 2015/0295849 A1 | 10/2015 | Xia et al. | | |
| 2015/0319049 A1 | 11/2015 | Nachum | | |
| 2016/0057209 A1 | 2/2016 | Parikh et al. | | |
| 2016/0085576 A1* | 3/2016 | Chastain | ............. | G06F 9/45533 718/1 |
| 2016/0119189 A1 | 4/2016 | Choi et al. | | |
| 2016/0127478 A1 | 5/2016 | Chastain et al. | | |
| 2016/0142427 A1 | 5/2016 | de los Reyes et al. | | |
| 2016/0156513 A1 | 6/2016 | Zhang et al. | | |
| 2016/0212016 A1 | 7/2016 | Vrzic et al. | | |
| 2016/0212017 A1 | 7/2016 | Li et al. | | |
| 2016/0234730 A1 | 8/2016 | John et al. | | |
| 2017/0223152 A1* | 8/2017 | Rahamim | ............... | H04L 69/22 |

OTHER PUBLICATIONS

Li, Yong, and Min Chen. "Software-defined network function virtualization: a survey." IEEE Access, vol. 3 (2015): 2542-2553.
Mastrangelo, Teresa. "5G: A Network Transformation Imperative" Heavy Reading: Intel White Paper. Dec. 2015. 11 pages.

* cited by examiner

US 10,764,394 B2

RESOURCE BASED FRAMEWORK TO SUPPORT SERVICE PROGRAMMABILITY FOR A 5G OR OTHER NEXT GENERATION MOBILE CORE NETWORK

TECHNICAL FIELD

The subject disclosure relates to wireless communications, e.g., a resource based framework to support service programmability for a mobile core network.

BACKGROUND

As communication networks evolve, new demands such as massive Internet of Things (IoT) communications, mission critical communications, and/or high throughput mobile broadband on the mobile network, create new challenges for the networking infrastructure providers to develop innovative and intelligent networking solutions that can deliver optimal connectivity as well as end user service quality. Conventional mobile core networks are not programmable in terms of their functionality and thus, addition of new services can be a difficult and time consuming process.

Although attempts have been made to expose some of the network capabilities, a dedicated network node, such a service control and exposure function (SCEF) is utilized to control such exposures for 3GPP networks. The SCEF acts as an service gateway and/or proxy to a cellular network by providing application programming interfaces (APIs) to enterprises and third party application developers for, in the case of IoT, small data transfers and/or control messages, and uses 3GPP-defined interfaces with the network elements in the mobile core network. However, the SCEF does not provide the scalability and flexibility to address future service needs of evolving communication networks.

DETAILED DESCRIPTION

Figure 1:
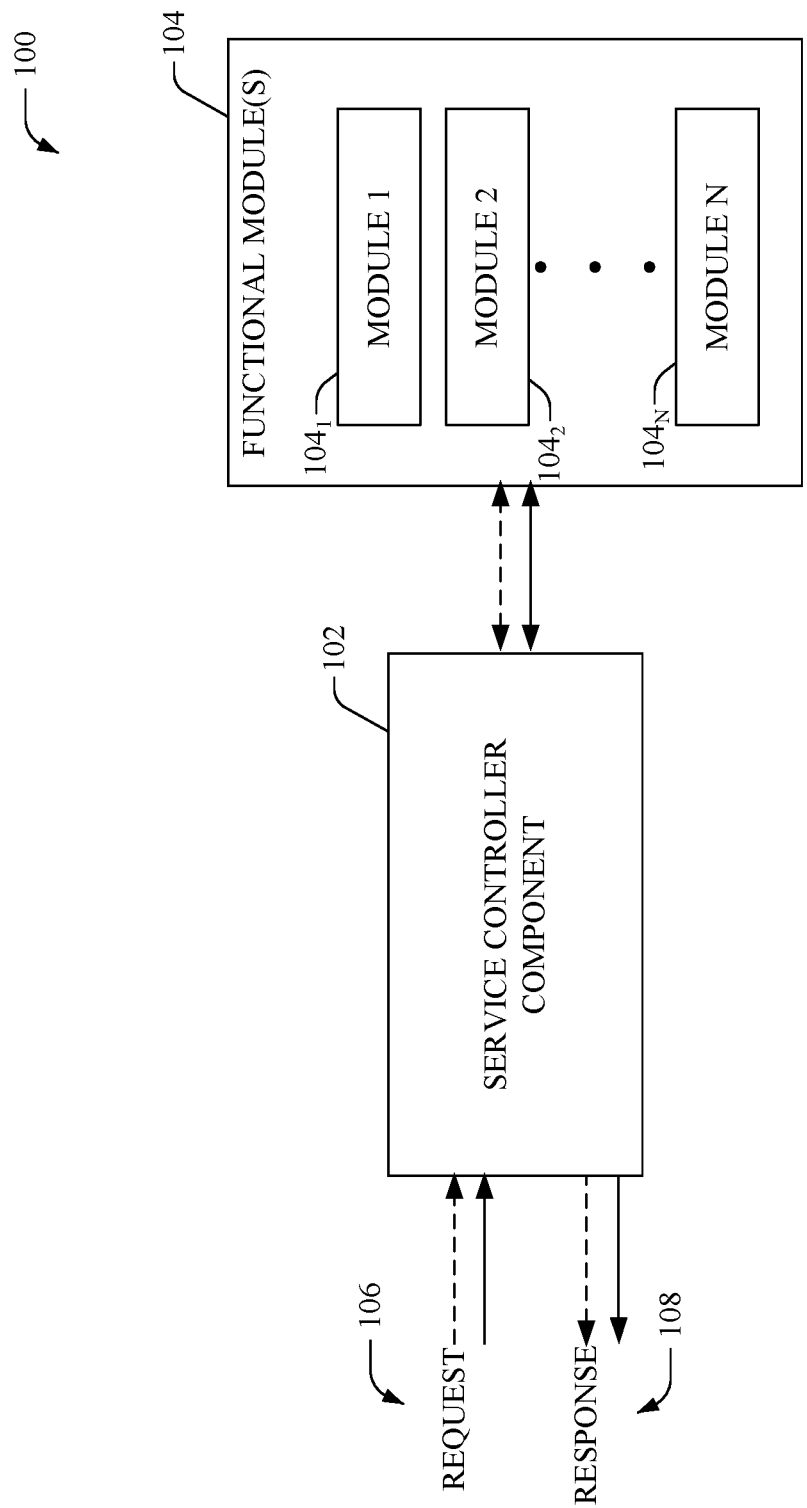
FIG. 1 illustrates an example system that provides a resource based framework to support service programmability of a core network.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," "agent," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

A conventional mobile core network is not programmable in terms of its functionality and accordingly, a process for adding new services in the conventional mobile core network can be difficult and time consuming. As the mobile core network evolves to an open and modular architecture (e.g., in 5G (fifth generation) mobile networks), non-programmable networks do not provide required scalability and flexibility. A new paradigm is disclosed herein to address the future service needs of 5G networks.

The systems and methods disclosed herein provide a network architecture that is programmable and employs a software based, modular functional infrastructure with standard interfaces. In this paradigm, network and service functions in the mobile network can be built and addressed as resources that can be configured and accessed with standard application program interfaces (APIs). Aspects and/or features of the disclosed subject matter can be exploited in substantially any wired or wireless communication technology, including, but not limited to 5G and/or future technologies.

Referring initially to FIG. 1, there illustrated is an example system 100 that provides a resource based framework to support service programmability of a core network according to one or more aspects of the disclosed subject matter. As an example, a core network of a communication network can comprise devices (e.g., gateways, servers, data stores, etc.) that provide communication services to user equipment that are connected to the communication network via a wired and/or wireless access network. Future communication services demand a flexible and programmable network that can support a broad range of use cases. For example, the number of connected devices that are capable of establishing connectivity with other devices and/or passive objects to exchange data continues to rise steadily over the high-speed mobile Internet. Thus, system 100 comprises a core network architecture that supports massive IoT, mission critical communications, and/or high throughput mobile broadband on the communication network. Further, system 100 supports real-time and/or on-demand network configurations and/or dynamic service provisioning. Furthermore, system 100 maximizes utilization efficiency of available network resources.

In one aspect, system 100 employs a modular functional infrastructure wherein a service controller component 102 is utilized to manage functional modules 104 (e.g., comprising modules 1-N ($104_1$-$104_N$); where N is most any natural number) that perform network and/or service functions (e.g., control-plane functions) of the core network. The functional modules 104 can be addressed as resources that are configured and/or accessed by employing yet undefined, open standard APIs that introduce programmability into the core network. As an example, the functional modules 104 can comprise modules that perform functions of, but are not limited to, switches, routers, home location register (HLR), serving GPRS support node (SGSN), gateway GPRS support node (GGSN), combined GPRS support node (CGSN), radio network controller (RNC), serving gateway (SGW), packet data network gateway (PGW), residential gateway (RGW), broadband remote access server (BRAS), carrier grade network address translator (CGNAT), deep packet inspection (DPI), provider edge (PE) router, mobility management entity (MME), element management system (EMS), etc. Conventionally, control plane entities of a core network communicate via industry-defined interfaces (e.g., defined by 3GPP). In contrast, the service controller component 102 employs open, standardized, protocol-independent, and/or non-proprietary APIs to communicate with the functional modules 104.

According to an aspect, the functional modules 104 are defined as on-demand, software-based, and/or plug and play resources that can be managed, in real-time, by the service controller component 102. The service controller component 102 can be an intelligent control plane element that coordinates and/or manages the resources, registers the resources, publishes the resources, manages security and/or access to the resources, etc. In one aspect, on receiving a request 106, the service controller component 102 can analyze the request, determine the resources required to response to the request, and match the requirements with available resources. It is noted that the dotted lines in FIG. 1 represent control plane data (e.g., control signals), while the solid lines represent user plane data. Once the necessary resources are assembled, the service controller component 102 can provide a response 108 that delivers the requested service. In one aspect, the requestor can utilize the information (e.g., a pointer) in the response 108 to access appropriate resources via a standard API call.

The architecture disclosed in system 100 facilitates application of network functions virtualization (NFV) and/or software-defined networking (SDN) technologies by employing a modular functional infrastructure, wherein the functional modules 104 are defined as on-demand, software based, plug and play, and/or real time managed resources with built-in API supports. NFV can virtualize network services that are conventionally being carried out by proprietary, dedicated hardware and instead host the network services on one or more virtual machines (VMs). Using NFV, network service providers do not need to purchase proprietary/dedicated hardware devices to build a service chain. NFV can improve scalability and flexibility and network capacity can easily be adjusted through software, resulting in reduced capital expenses and/or operating expenses. In one aspect, the service controller component 102 can facilitate load sharing to host the functional modules 104. For example, if a function hosted via a first VM requires more resources, for example, the service controller component 102 can move the VM to another physical server and/or provision another VM on the original server to handle part of the load.

NFV and SDN are different technologies but complementary. SDN architectures decouple or disassociate network control (e.g., control plane) and forwarding (e.g., data plane) functions. This allows for dynamic, programmable, and/or scalable computing and storage. The SDN architecture can be at least (i) directly programmable; (ii) agile; (iii) centrally managed; (iv) programmatically configured; and/or (v) open standards-based and vendor-neutral. In one example, system 100 can be deployed in 5G networks that provide enhanced mobile broadband, for example, ultra high bandwidth (e.g., 20 Gbps), high spectral efficiency (e.g., 3.5× of LTE), ultra dense networks, and/or energy efficiency. Further, the 5G networks can provide ultra-reliable (e.g., high reliability greater than 99.999%) and low latency communications (e.g., ultra low latency of ~1 msec and/or low network access and synchronization time). Furthermore, the 5G networks can facilitate massive machine type communication (e.g., ultra high density ($10^6$/sq km), long battery life (10 years+), high system gain (better than NB-IoT and more efficient).

Figure 2:
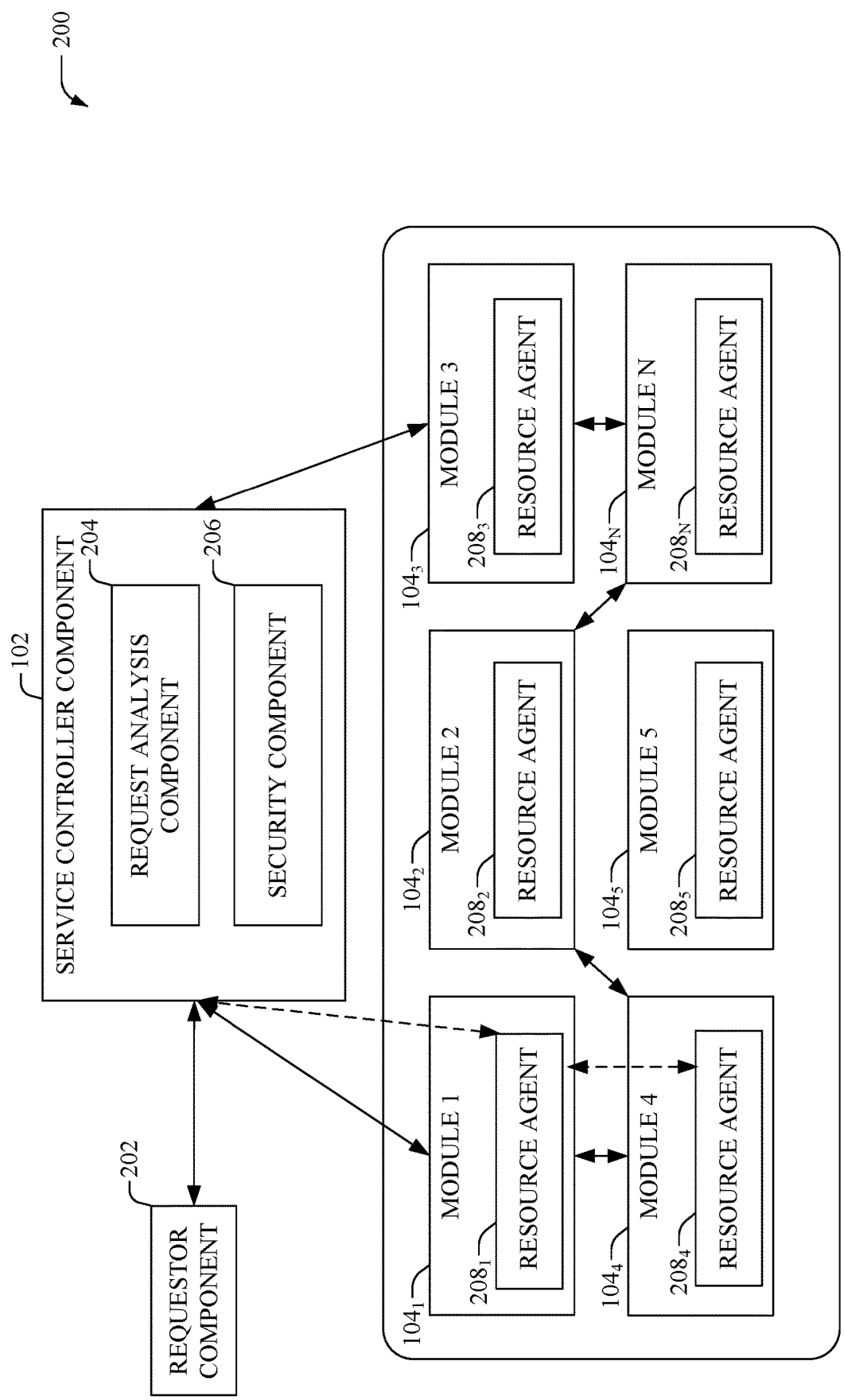
FIG. 2 illustrates an example system for accessing network functions via standard application programming interfaces (APIs).

Referring now to FIG. 2, there illustrated is an example system 200 for accessing network functions via open and standard APIs, in accordance with an aspect of the subject disclosure. It is noted that the service controller component 102 and modules 1-N ($104_1$-$104_N$) can comprise functionality as more fully described herein, for example, as described above with regard to system 100. Although system 200 is described with respect to a 5G network, it is noted that the subject disclosure is not limited to 5G networks and can be utilized in most any communication network. Moreover, system 500 provides an intelligent, flexible, and dynamic network architecture that can enable both network operators and service/application providers in delivering the best in class IoT infrastructure that is scalable, delivers superior end user quality of experience, and/or improves a revenue engine by creating new service models, thereby meeting and exceeding their business objectives.

According to an embodiment, the service controller component 102 communicates via open (e.g., non-proprietary and/or protocol independent) and standardized interfaces with network functions that are represented as resources (e.g., modules 1-N ($104_1$-$104_N$); wherein N is most any natural number). When a request is sent to the network, for example, by a requestor component 202, the service controller component 102 can receive the request and utilize a request analysis component 204 to facilitate responding to the request. As an example, the requestor component 202 can be, but is not limited to a user equipment, a particular service such as a mission critical emergency service, and/or an IoT device. In an aspect, the request analysis component 204 can determine data associated with the request, such as but not limited to, the nature and/or type of the request, the user that requested it (e.g., a user identifier), the device the request has been received from (e.g., device identifier and/or device type/model/make), and/or other related policies and/or preferences (e.g., defined by user and/or network operator). As an example, the request analysis component 204 can determine the data based on an analysis of information in (and/or appended to) the request itself and/or based on information retrieved from a network data store (not shown). Further, the request analysis component 204 can determine the resources required to respond to the request and match the requirements of the request with available resources.

On determining the resources necessary to respond to the request, the request analysis component 204 can provide, to the requestor component 202, a response that enables the requestor component 202 to access the determined resources via an API call. Further, a security component 206 can be utilized to control access to specified functions and/or services. For example, access control can be based on access parameters such as, but not limited to, user role, device type, time/date, etc., that can be defined by a network operator. In an aspect, the security component 206 can verify that the requestor component 202 is authorized to access the requested function/service. If determined by the security component 206 that the requestor component 202 is authorized to access the requested function/service, the response can be transmitted to the requestor component 202. Alternatively, if determined by the security component 206 that the requestor component 202 is not authorized to access the requested function/service, a response is not sent to the requestor component 202 and/or an error message can be transmitted to the requestor component 202. To the requestor component 202, the network is made to appear as a unique set of resources tailored to a particular request in real time.

Consider an example scenario of a call being dropped. In this example scenario, the requestor component 202 can send an error code (e.g., indicative of a dropped call) to the service controller component 102. The request analysis component 204 can analyze the error code and determine resources available to respond to the error (e.g., based on resource data stored in a network data store). The service controller component 102 can then transmit to the requestor component 202, a descriptor that is a pointer to the determined resources. Additionally or optionally, access control can be implemented by the security component 206. For example, the security component 206 can provide authorized requestors with credentials that can then be forwarded by the requestor to appropriate resources to gain access. It is noted that the request can be a one-time request and/or a subscription (e.g., triggered based on an event, periodically, at a specified time, etc.)

The service controller component 102 controls network functions that are defined and/or realized as software modules, for example, modules 1-N ($104_1$-$104_N$), using NVFs and connected via a standard and/or common interface. Examples of the network functions comprise, but are not limited to, authentication, authorization, and accounting (AAA), data analytics, mobility on-demand, charging, data compression, content optimization, security, etc. In one aspect, network functions, represented by module 1-N ($104_1$-$104_N$), can comprise respective resource agents, for example, resource agents 1-N ($208_1$-$208_N$), that manage the network functions (e.g., based on predefined policies) and communicate the current state (e.g., available functions, resources, and/or capabilities) of the modules 1-N ($104_1$-$104_N$) to the service controller component 102.

Network services can be supported by using modules 1-N ($104_1$-$104_N$) (expressed, represented, and/or accessed as resources) that are used to implement the network service. The service controller component 102 can select, in real time, at least a portion of the modules 1-N ($104_1$-$104_N$) to form a uniform resource for a specific service, for a specific user, at a specified time. Since the modules 1-N ($104_1$-$104_N$) are API-enabled, they can be programmable in real time to support 5G services. As an example, programmability can be provided by: (i) a first set of APIs for management of the functional modules themselves such as, but not limited to, automatic configurations; and/or (ii) a second set of APIs for providing the functions as a service. Moreover, advanced services can be built dynamically and programmatically by the service controller component 102 by employing the programmable interface of the modules 1-N ($104_1$-$104_N$).

Figure 3:
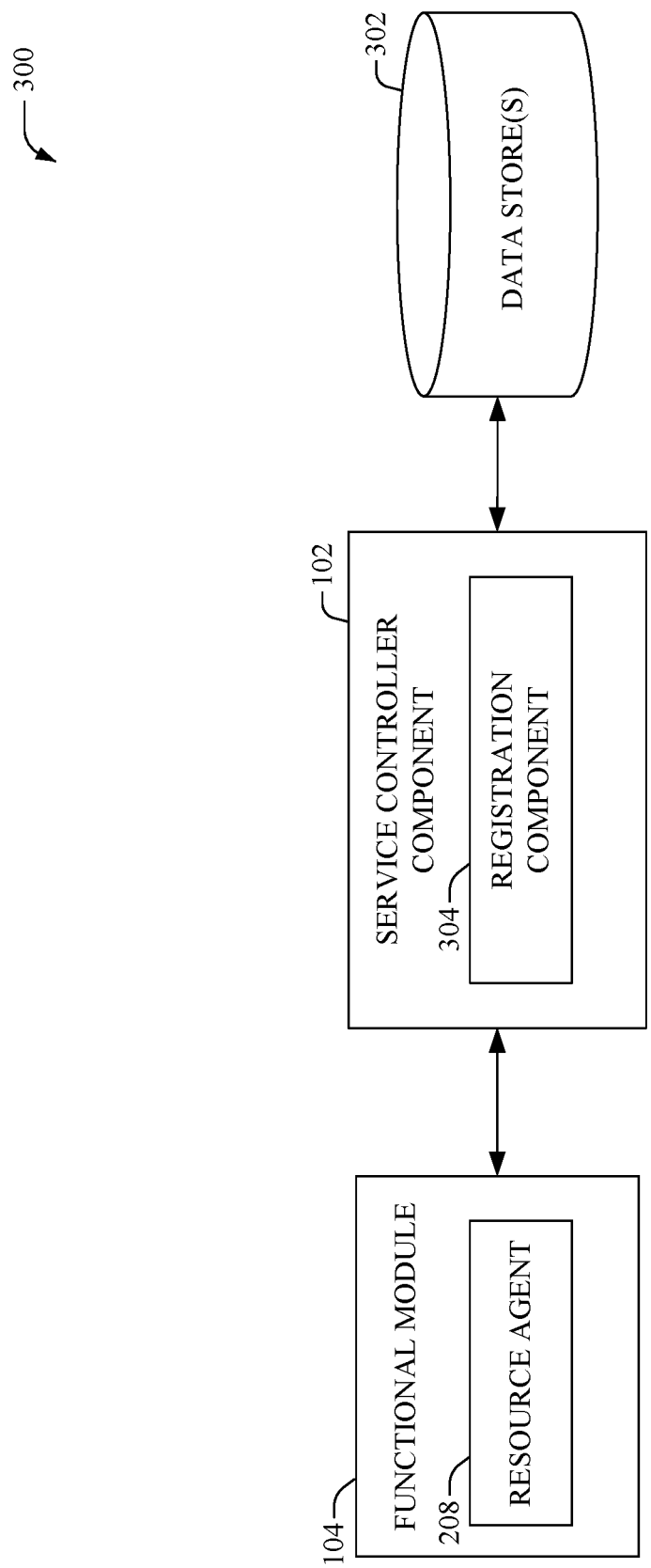
FIG. 3 illustrates an example system that facilitates registration of a functional module with a service controller.

Referring now to FIG. 3, there illustrated is an example system 300 that facilitates registration of a functional module with a service controller, in accordance with an aspect of the subject disclosure. In one example, the service controller component 102 can comprise a service engine that determines resources that are to be employed to handle a request and delivers, to a requestor, information required to fulfill the request. The control-plane network is completely programmable such that the service controller component 102 can create and/or allocate resources dynamically (e.g., based on request data). In one aspect, the service controller component 102 can manage resources dynamically using NFV and SDN technologies. The resource based API enablement by all the network functional modules is essential for the dynamic allocation and management of required resources. It is noted that the service controller component 102 can comprise functionality as more fully described herein, for example, as described above with regard to systems 100 and 200. Further, functional module 104 can be similar to one of the modules 1-N (104$_1$-104$_N$) and can comprise functionality as more fully described herein, for example, as described above with regard to one of the modules 1-N (104$_1$-104$_N$). Furthermore, resource agent 208 can be similar to one of the resource agents 1-N (208$_1$-208$_N$) and can comprise functionality as more fully described herein, for example, as described above with regard to one of the resource agents 1-N (208$_1$-208$_N$). Additionally, although system 300 is described with respect to a 5G network, it is noted that the subject disclosure is not limited to 5G networks and can be utilized in most any communication network.

In an aspect, the service controller component 102 maintains, and/or has access to, data related to all network functions that are represented as resources and are accessible via an API. As an example, the data can be stored in data store 302. When a new functional module 104 is to be added, the resource agent 208 (e.g., an API-enabled resource agent) can send a registration request to the service controller component 102. A registration component 304 can collect the registration data and store the data within the data store 302. In one example, the registration request can include, or be appended with, information related to the functional module 104, such as, but not limited to, a network function identifier (ID) indicative of the functional module 104, a host ID indicative of a device hosting the functional module 104, a functional description (e.g., description of a function performed by the functional module 104), access control information and/or policies (e.g., list of devices and/or users that are allowed to access the functional modules, policies that restrict access based on defined events, etc.), a data model (e.g., data that helps interpret information returned by the functional module), available APIs, etc. In one aspect, updates to the registration data can be sent to the service controller component 102 by the resource agent 208 at most any time, for example, periodically, in response to an event, on-demand, at a defined time, etc.

It is noted that the data store 302 can include volatile memory(s) or nonvolatile memory(s), or can include both volatile and nonvolatile memory(s). Examples of suitable types of volatile and non-volatile memory are described below with reference to FIG. 9. The memory (e.g., data stores, databases) of the subject systems and methods is intended to include, without being limited to, these and any other suitable types of memory. Although FIG. 3 depicts the data store 302 being external to the service controller component 102, the subject specification is not that limited and the data store 302 can be included within (completely or partially) the service controller component 102.

Figure 4:
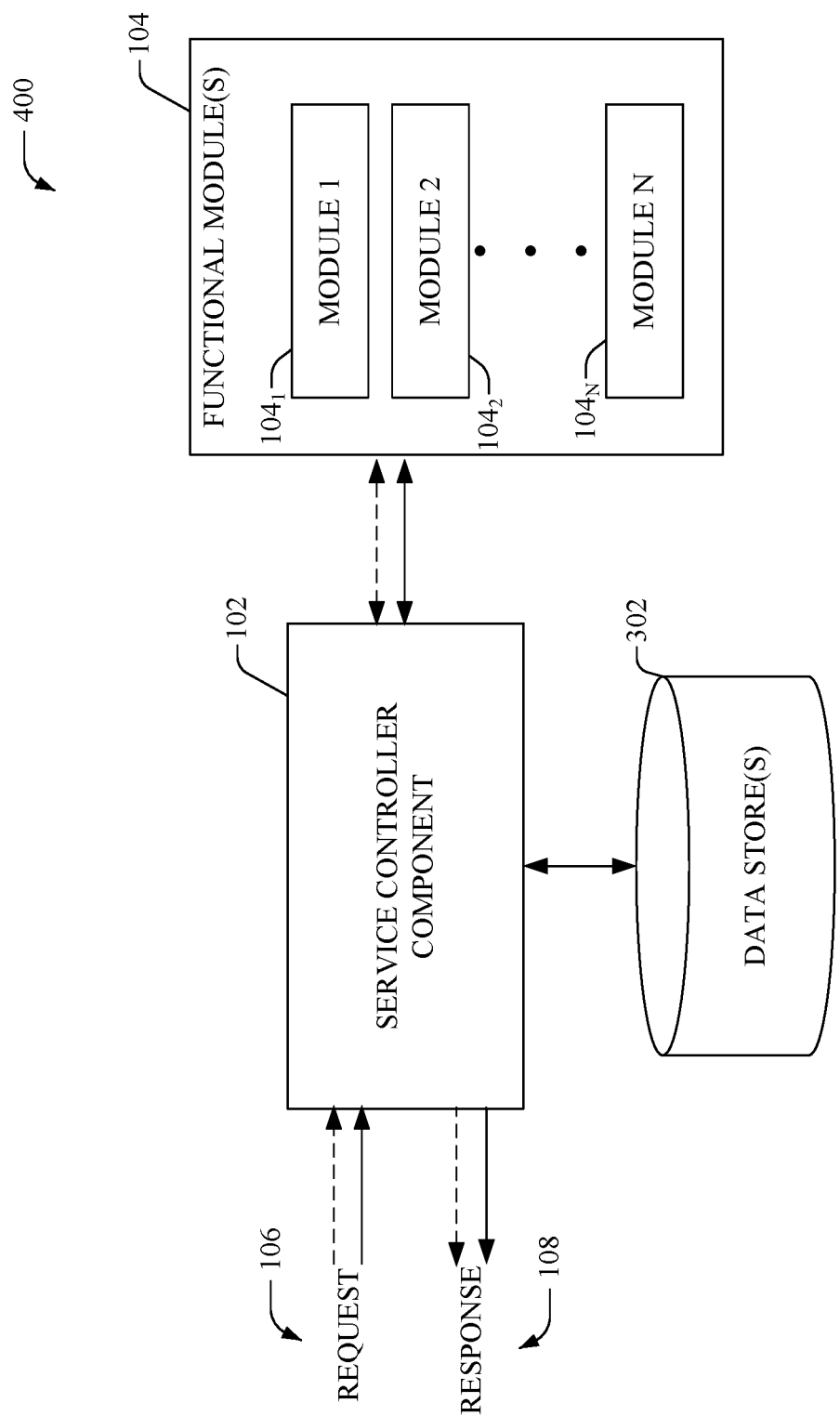
FIG. 4 illustrates an example system for dynamic service provisioning.

Referring now to FIG. 4, there illustrated is an example system 400 for dynamic service provisioning, according to an aspect of the subject disclosure. It is noted that the service controller component 102, functional module 104, and data store 302 can comprise functionality as more fully described herein, for example, as described above with regard to systems 100-300.

When a request 106 is received by the service controller component 102, the service controller component 102 can determine (e.g., by employing the request analysis component 204) a type/classification of the request, a user that has initiated the request, a device that has initiated/transmitted the request, and/or other related policies and preferences, determine the parameters associated with resources that can handle the request, and match the determined parameters with parameters of available resources. If a match is not found (e.g., an available resource is not found), the service controller component 102 can dynamically create the resource. In one aspect, the service controller component 102 can add instances of a registered resource, or dynamically assemble a new resource utilizing or assembling a number of existing resources. In an example scenario, on determining that resources for handling a received request are not available based on the information published by the functional modules 104 (e.g., information stored in data store 302), the service controller component 102 can transmit and/or broadcast descriptor data related to the request to one or more of the functional modules 104. Based on the descriptor data, the functional modules 104 can determine whether they can handle the request. If determined that a functional module 104 can handle the request, it can respond to the service controller component 102, for example, by temporarily or permanently publishing its capabilities. If the capabilities are to be permanently published, the service controller component 102 can store the published data in the data store 302. Further, the service controller component 102 can then transmit a response 108 that comprises a pointer to the functional module 104. The requestor can access the functional module 104 via a standard API call. It is noted that the dotted lines in FIG. 4 represent control plane data (e.g., control signals), while the solid lines represent user plane data.

According to an embodiment, the network architecture disclosed herein with respect to systems 100-400 provides several non-limiting advantages and features such as, but not limited to, (i) network functions can be readily represented and accessed using standard interfaces, thus significantly reducing complexity that exists in conventional networks; (ii) a resource tree can be built dynamically to enable real time communication requirements; (iii) improved ease of management: since all network functions are represented by a common information model, they can be managed using standard mechanism with automation; (iv) the use of standard interface allows open and fast innovation instead of vendor lock-ins to proprietary solutions; and/or (v) total programmability in the core network that enables the core network to be software ready.

Figure 5:
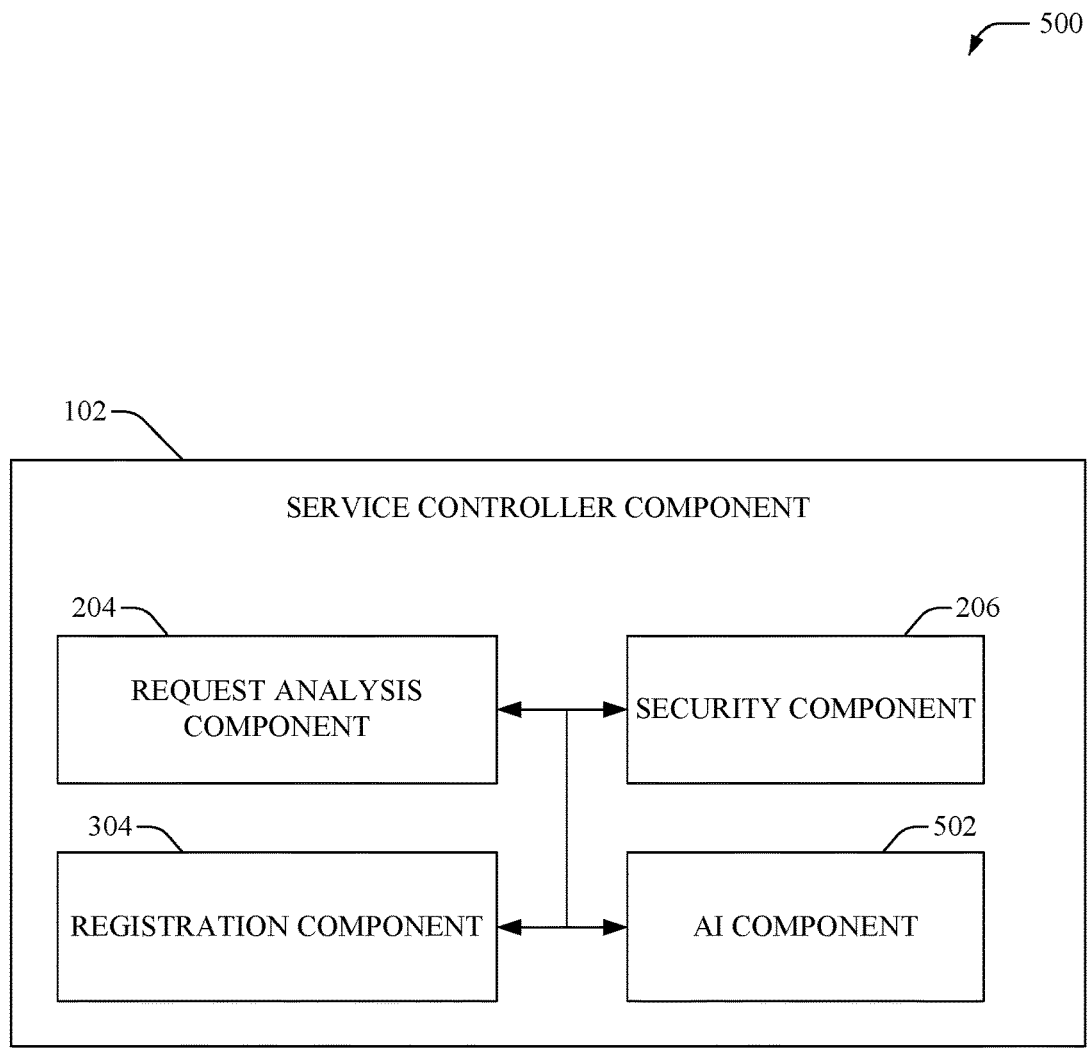
FIG. 5 illustrates an example system that facilitates automating one or more features in accordance with the subject embodiments.

Referring now to FIG. 5, there illustrated is an example system 500 that employs an artificial intelligence (AI) component (502) to facilitate automating one or more features in accordance with the subject embodiments. It can be noted that the service controller component 102, request analysis component 204, security component 206, and the registration component 304 can comprise functionality as more fully described herein, for example, as described above with regard to systems 100-400.

In an example embodiment, system 500 (e.g., in connection with managing and controlling resources with built-in API supports) can employ various AI-based schemes (e.g., intelligent processing/analysis, machine learning, etc.) for carrying out various aspects thereof. For example, a process for determining which resources to select, determining optimal resources for specific type of traffic and/or device, determining metrics that are to be tracked, load sharing, determining how to handle a request, etc. can be facilitated via an automatic classifier system implemented by AI component 502. Moreover, the AI component 502 can various exploit artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, AI component 502 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 502 can be used to automatically learn and perform a number of functions, comprising but not limited to determining according to a predetermined criteria, resources to handle a specific request, optimal resources for specific type of traffic, metrics that are to be tracked, load sharing parameters, state of a resource, etc. The criteria can comprise, but is not limited to, historical patterns and/or trends, network operator preferences and/or policies, application/service provider preferences, predicted traffic flows, event data, latency data, reliability/availability data, current time/date, and the like.

Figure 6:
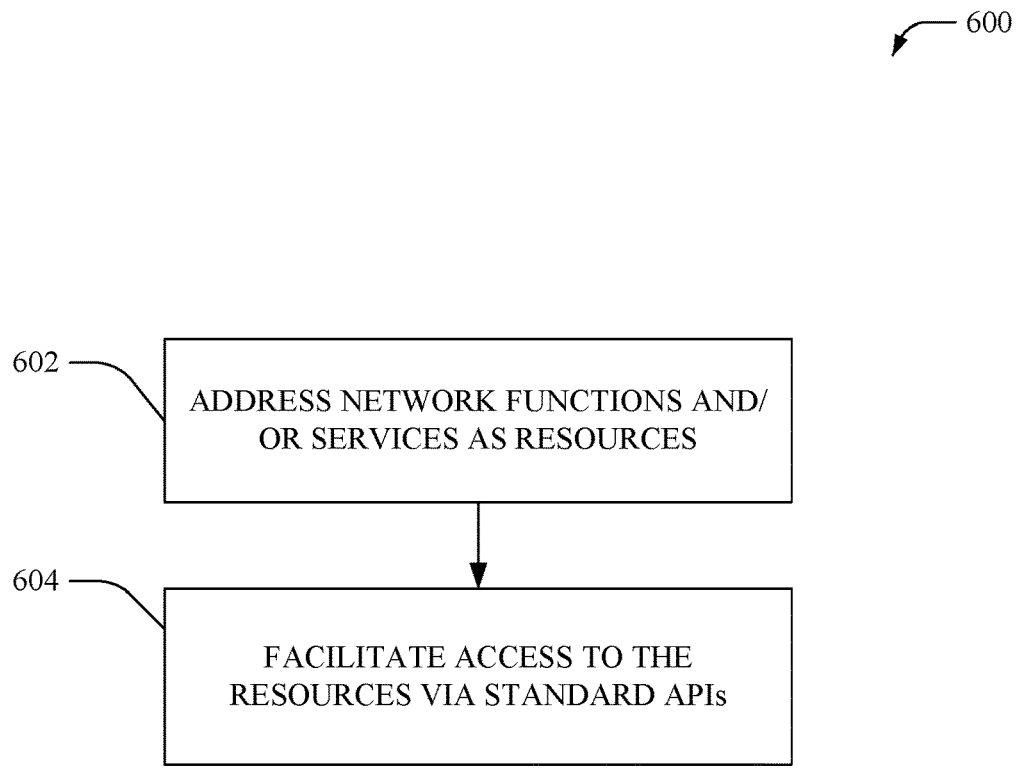
FIG. 6 illustrates an example method that supports service programmability within a communication network.
Figure 7:
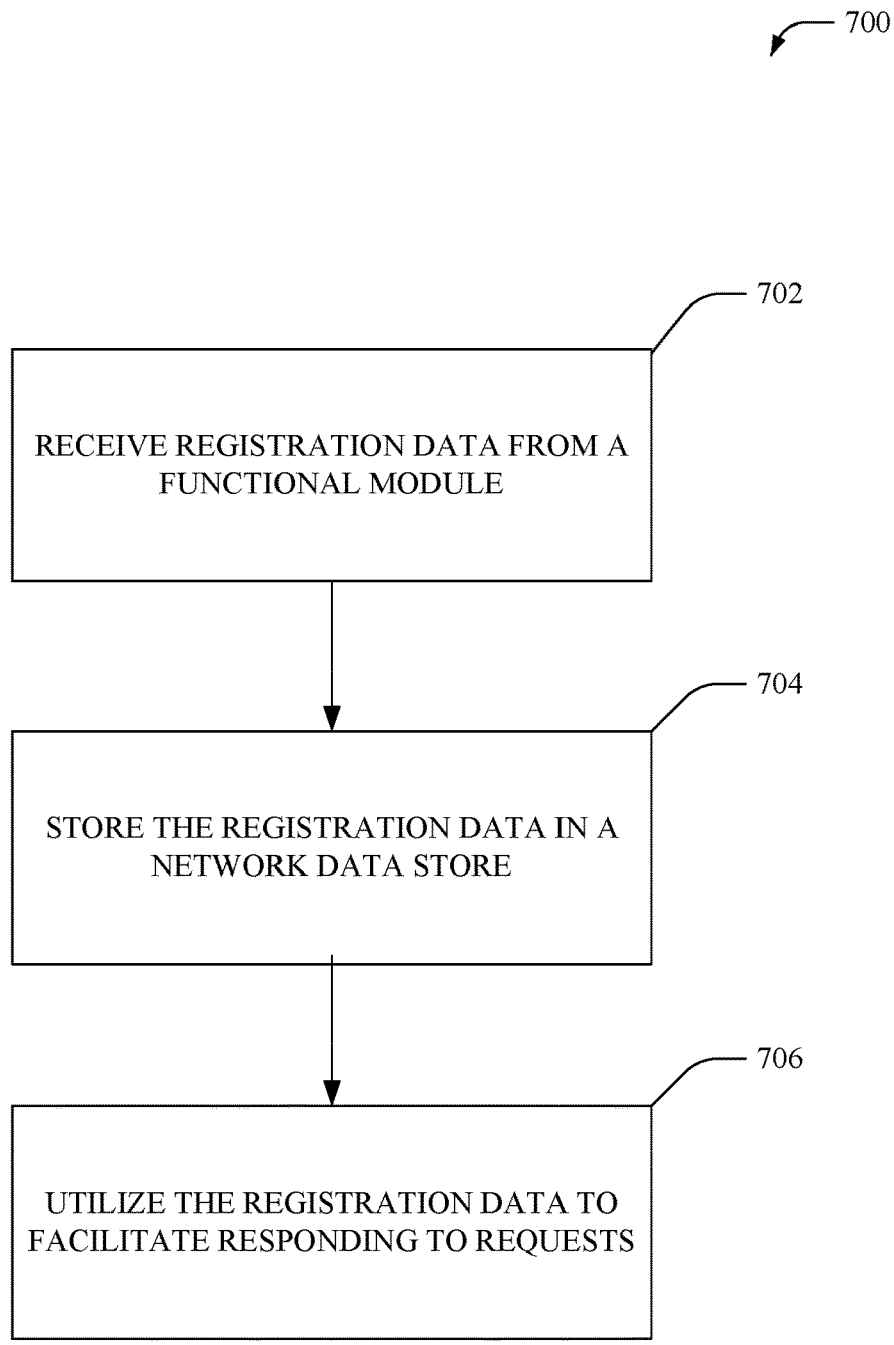
FIG. 7 illustrates an example method that facilitates registration of a functional module.
Figure 8:
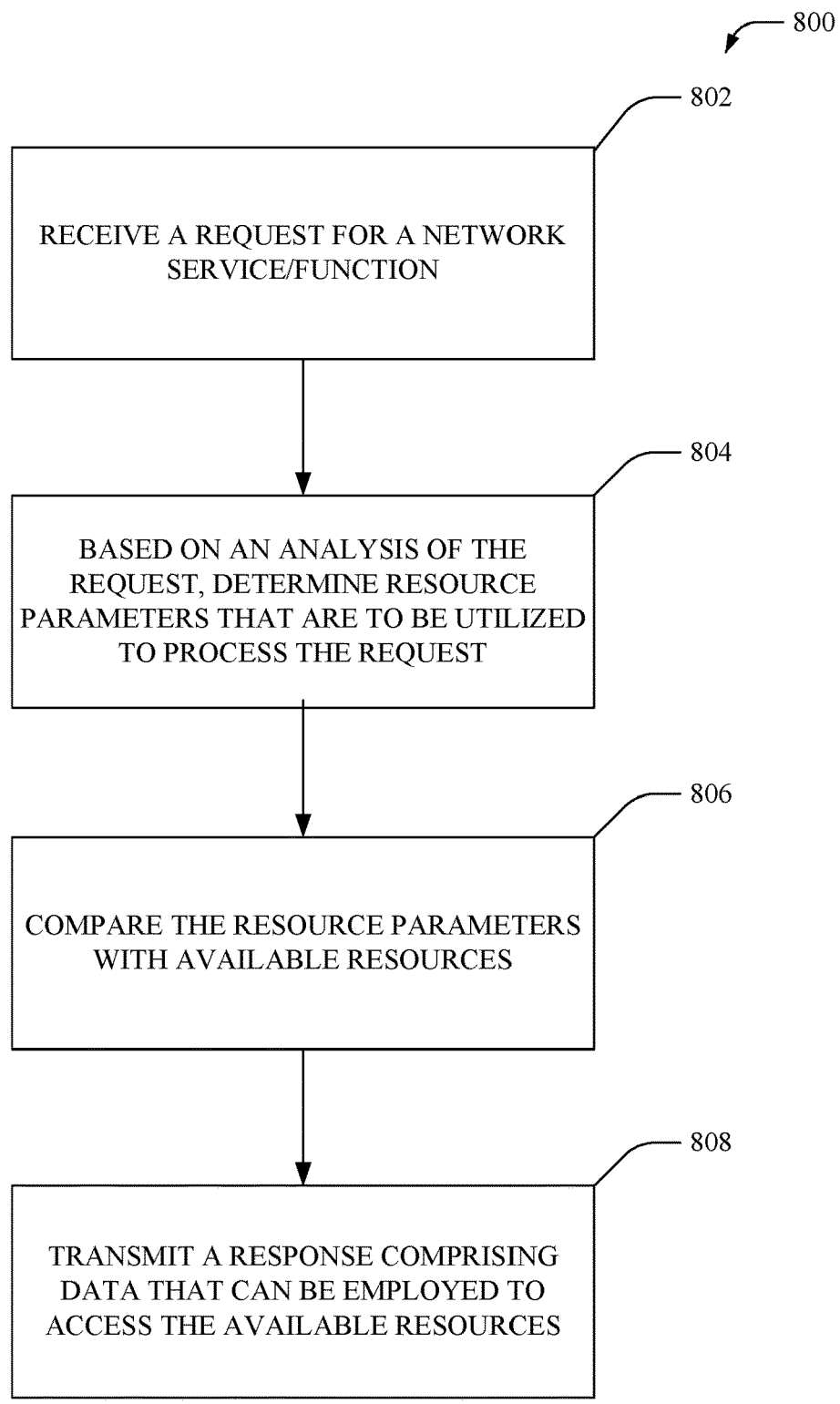
FIG. 8 illustrates an example method that facilitates providing an on-demand and/or customized service for network requests.

FIGS. 6-8 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 6 there illustrated is an example method 600 that supports service programmability within a communication network, according to an aspect of the subject disclosure. In an aspect, method 600 can be implemented by one or more network devices (e.g., core network device) of a communication network (e.g., cellular network). At 602, network functions and/or services can be addressed and/or represented as resources. As an example, the network functions and/or services can comprise, but are not limited to, AAA, data analytics, mobility on-demand, billing, data compression, content optimization, security, etc. At 604, access to the resources can be facilitated via open and/or standard (e.g., non-proprietary and/or protocol agnostic) APIs. Distinct network functions/services can be defined and realized as software modules (e.g., functional module 104) using NVFs and connected via a standard and/or common interface and controlled by a service orchestrator (e.g., service controller component 102). Moreover, the software module can comprise a resource agent that manages the module, for example, based on predefined policies, and communicates with the service orchestrator regarding an operational status of the software modules. Services can be supported by using only modules (expressed, represented, and/or accessed as resources) required to implement the service and these modules can be assembled in real time to form a uniform resource that is customized for a particular service, a particular user, and/or a particular time associated with a request.

FIG. 7 illustrates an example method 700 that facilitates registration of a functional module, according to an aspect of the subject disclosure. As an example, method 700 can be implemented by one or more network devices (e.g., core network device) of a communication network (e.g., cellular network). At 702, registration data can be received from a functional module. As an example, a functional module can comprise a software module that is employed to perform control-plane functions, such as, but not limited to, AAA, data analytics, mobility on-demand, billing, data compression, content optimization, security, etc. The registration data can comprise information associated with the functional module such as, but not limited to, a network function ID that is indicative of the functional module 104, a host ID (e.g., identifier of a device that hosts the functional module), a functional description (e.g., description of a function performed by the functional module), access control information and policies (e.g., list of devices and/or users that are allowed to access the functional modules, policies that restrict access based on defined events, etc.), a data model (e.g., data that helps interpret information returned by the functional module), available APIs, etc. At 704, the registration data can be stored within a network data store. Further, at 706, the registration data can be utilized to facilitate responding to service requests subsequently received by the network. For example, on receiving a network service request, the data stored in the data store (e.g., registration data from one or more functional modules) can be analyzed to determine resources that can (e.g., optimally) process the request.

FIG. 8 illustrates an example method 800 that facilitates providing an on-demand and/or customized service for network requests, according to an aspect of the subject disclosure. As an example, method 800 can be implemented by one or more network devices (e.g., core network device) of a communication network (e.g., cellular network). At 802, a request for a network service and/or function can be received. As an example, the request can comprise and/or be appended with data associated with the requestor (e.g., a user equipment, a particular service such as a mission critical emergency service, an IoT device, etc.), such as, but not limited to user ID, device identifier and/or device data (e.g., device type/model/make), preferences or policies, etc. At 804, resource parameters (e.g., resource requirements) that are to be utilized to process the request can be determined based on an analysis of the request and/or data from a network data store (e.g., data store 302). Further, at 806, available resources can be compared with the resource parameters. In an example, the comparison can result in selecting available and/or optimal resources that are determined to satisfy the resource requirements (e.g., having parameters that match the determined parameters). At 808, a response comprising data that can be employed to access the available resources can be transmitted to the requestor. For example, the data can include a pointer to the available resources. Moreover, the requestor can utilize the pointer to access the available resources via an API call.

Figure 9:
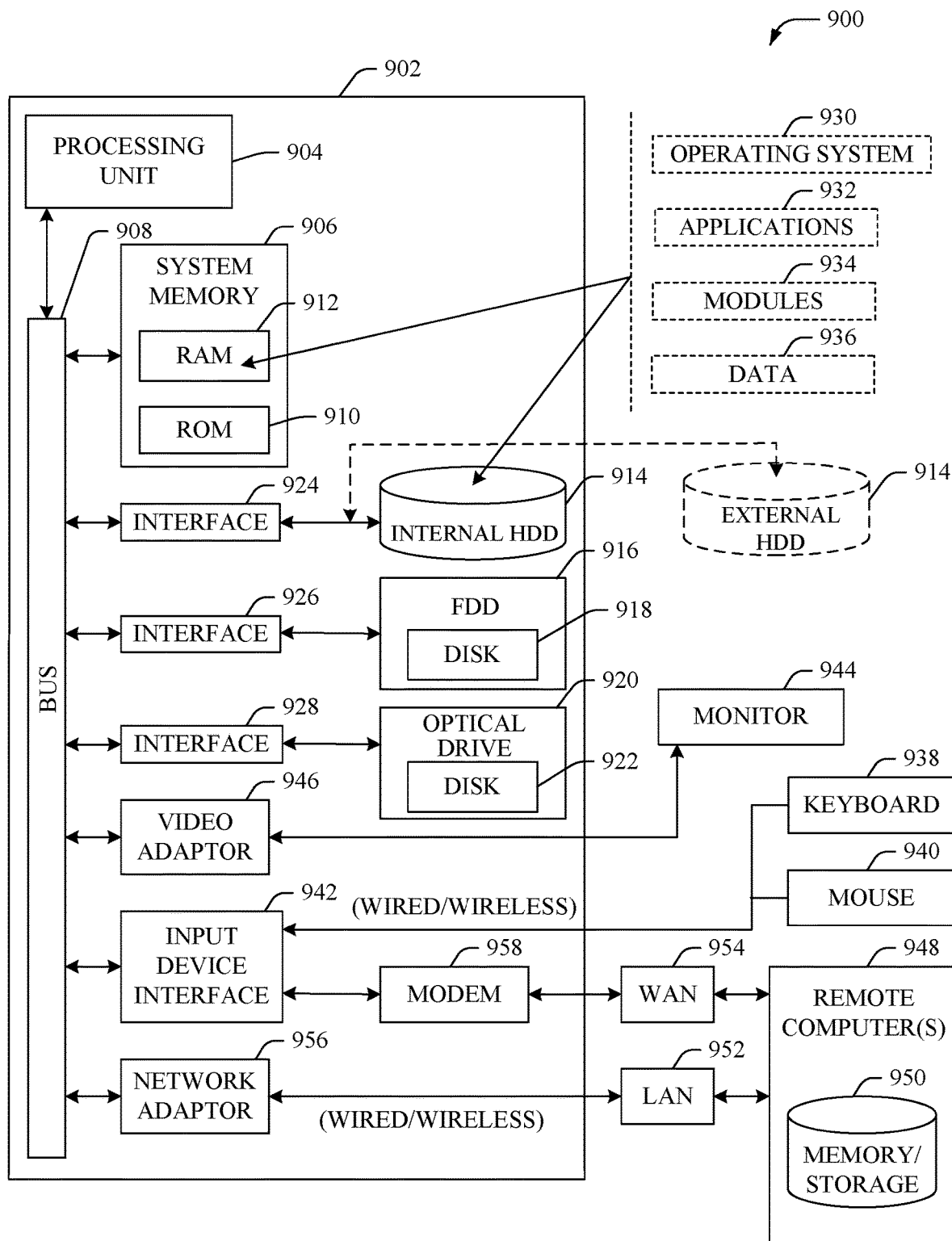
FIG. 9 illustrates a block diagram of a computer operable to execute the disclosed communication architecture.

Referring now to FIG. 9, there is illustrated a block diagram of a computer 902 operable to execute the disclosed communication architecture. In order to provide additional context for various aspects of the disclosed subject matter, FIG. 9 and the following discussion are intended to provide a brief, general description of a suitable computing environment 900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 9, the example environment 900 for implementing various aspects of the specification comprises a computer 902, the computer 902 comprising a processing unit 904, a system memory 906 and a system bus 908. As an example, the component(s), application(s) server(s), equipment, system(s), interface(s), gateway(s), controller(s), node(s), entity(ies), function(s), agent(s), and/or device(s) (e.g., service controller component 102, functional module(s) 104, requestor component 202, request analysis component 204, security component 206, modules 1-N (104$_1$-104$_N$), resource agents 1-N (208$_1$-208$_N$), resource agent 208, registration component 304, data store(s) 302, AI component 502, etc.) disclosed herein with respect to systems 100-500 can each comprise at least a portion of the computer 902. The system bus 908 couples system components comprising, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 comprises read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during startup. The RAM 912 can also comprise a high-speed RAM such as static RAM for caching data.

The computer 902 further comprises an internal hard disk drive (HDD) 914, which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 912, comprising an operating system 930, one or more application programs 932, other program modules 934 and program data 936. All or portions of the operating system, applications, modules, and/or data can also be cached in the RAM 912. It is noted that the specification can be implemented with various commercially available operating systems or combinations of operating systems.

A user can enter commands and information into the computer 902 through one or more wired/wireless input devices, e.g., a keyboard 938 and/or a pointing device, such as a mouse 940 or a touchscreen or touchpad (not illustrated). These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc. A monitor 944 or other type of display device is also connected to the system bus 908 via an interface, such as a video adapter 946.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically comprises many or all of the elements described relative to the computer 902, although, for purposes of brevity, only a memory/storage device 950 is illustrated. The logical connections depicted comprise wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also comprise a wireless access point disposed thereon for communicating with the wireless adapter 956.

When used in a WAN networking environment, the computer 902 can comprise a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be noted that the network connections shown are example and other means of establishing a communications link between the computers can be used.

The computer 902 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
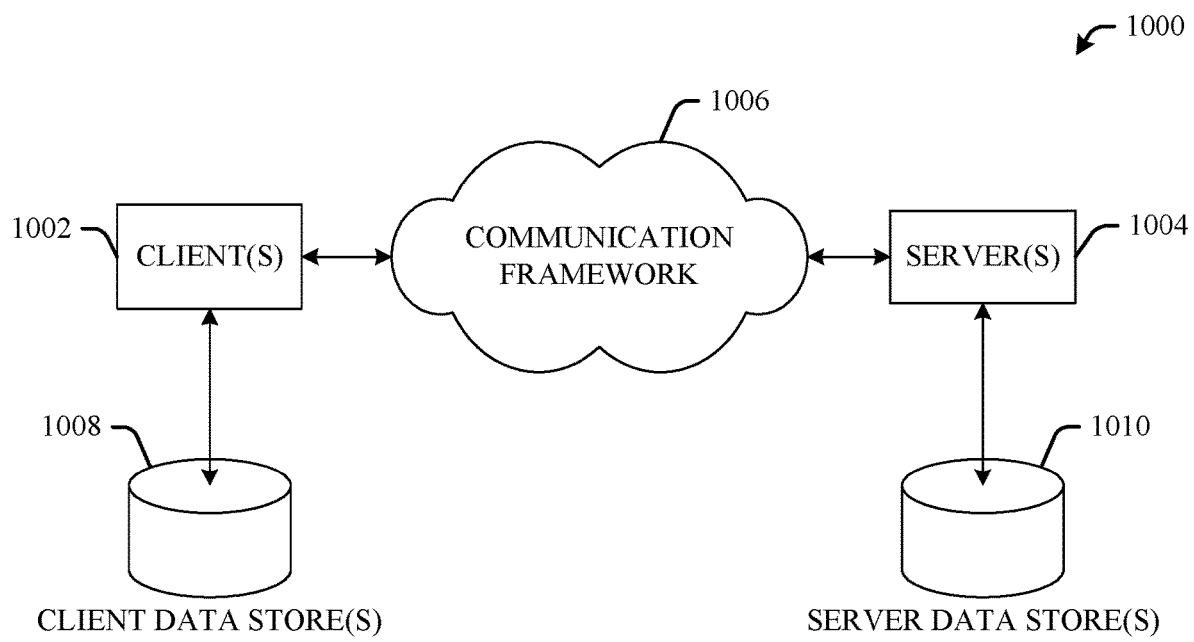
FIG. 10 illustrates a schematic block diagram of a computing environment in accordance with the subject specification

Referring now to FIG. 10, there is illustrated a schematic block diagram of a computing environment 1000 in accordance with the subject specification. The system 1000 comprises one or more client(s) 1002. The client(s) 1002 can be hardware and/or software (e.g., threads, processes, computing devices).

The system 1000 also comprises one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet may comprise a cookie and/or associated contextual information, for example. The system 1000 comprises a communication framework 1006 (e.g., a global communication network such as the Internet, cellular network, etc.) that can be employed to facilitate communications between the client(s) 1002 and the server(s) 1004.

Communications can be facilitated via a wired (comprising optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A network device of a communication network, comprising:
    a processor; and
    a memory that stores executable instructions that, when executed by the processor, facilitate performance of operations, comprising:
        addressing control-plane network functions, associated with a control-plane of the communication network, as resources;
        in response to receiving, from a user equipment, a request for a network service:
            determining that there is not a matching resource of the resources that is able to perform the network service; and
            creating a new resource that is able to perform the network service, the new resource being created from a subset of the resources;
        determining access data that comprises memory location data associated with new resource; and
        directing, to the user equipment, the access data that comprises the memory location data associated with the new resource.

2. The network device of claim 1, wherein the operations further comprise:
    receiving, from the user equipment, request data indicative of the request, and wherein the directing comprises facilitating, in response to the receiving, a transmission of response data that comprises the access data.

3. The network device of claim 2, wherein the operations further comprise:
    based on an analysis of the request data, determining a first parameter to handle the request; and
    comparing the first parameter to second parameters associated with the resources.

4. The network device of claim 3, wherein the operations further comprise:
    determining that there is not the matching resource of the resources that is able to perform the network service based on determining that the second parameters of the specified portion of the resources does not satisfy a matching criterion associated with the first parameter.

5. The network device of claim 2, wherein facilitating the transmission comprises facilitating the transmission in response to determining that the user equipment is authorized to gain the access to the new resource.

6. The network device of claim 1, wherein the access data comprises pointer data indicative of a pointer to the new resource.

7. The network device of claim 1, wherein the operations further comprise:
    receiving, from respective resource agents that manage the control-plane network functions, state data indicative of respective states of the control-plane network functions, wherein the state data comprises information indicative of an availability of the control-plane network functions, and wherein the creating the new resource is based on the state data.

8. The network device of claim 1, wherein the operations further comprise:
    during initialization of a control-plane network function of the control-plane network functions, receiving, from the control-plane network function, registration data; and
    storing the registration data in a network data store, and wherein the determining the access data comprises determining the access data based on the registration data.

9. The network device of claim 8, wherein the registration data comprises identifier data indicative of the control-plane network function or description data indicative of a functional description of the control-plane network function.

10. The network device of claim 1, wherein the addressing comprises addressing a control-plane network function of the control-plane network functions as a plug-and-play resource.

11. A method, comprising:
    representing, by a network device of a communication network that comprises a processor, control-plane functions of the communication network, as resources;
    receiving, by the network device from a user equipment, request data indicative of a request for a network service;
    based on the request data:
        determining, by the network device, that there is not a matching resource of the resources that is able to perform the network service; and
        generating, by the network device, a new resource that is able to perform the network service, the new resource being generated from a subset of the resources; and
    directing, by the network device, memory information to the user equipment that allows the user equipment to access a memory location associated with the new resource.

12. The method of claim 11, wherein the receiving the request data comprises receiving error data indicative of an error code.

13. The method of claim 11, wherein the generating the new resource is based on respective state data indicative of availability of the control-plane functions.

14. The method of claim 11, further comprising:
directing, by the network device, descriptor data associated with the request to the resources; and
as a function of the directing, receiving, by the network device, respective capability data from the resources, wherein the capability data represents a capability of the resource and wherein the generating the new resource is based on the capability data.

15. The method of claim 11, wherein the representing comprises representing the control-plane functions as the resources that have built-in application programming interface supports.

16. The method of claim 11, wherein the generating comprises generating the new resource based on determining that the request data satisfies an access control criterion.

17. A non-transitory machine-readable storage medium, comprising executable instructions that, when executed by a processor of a network device of a communication network, facilitate performance of operations, comprising:
representing control-plane services of the communication network as resources that comprise respective application programming interface enabled resource agents that facilitate a management of the resources;
receiving, from a user equipment, request data indicative of a request for a network service;
based on the request data:
determining, by the network device, that there is not a matching resource of the resources that is able to perform the network service; and
creating a new resource that is able to perform the network service, the new resource being created from a subset of the resources; and
facilitating a transfer of memory information to the user equipment, wherein the memory information is to be utilized to allow the user equipment to access a memory location associated with the new resource.

18. The non-transitory machine-readable storage medium of claim 17, wherein the representing comprises registering the control-plane services via the respective application programming interface enabled resource agents.

19. The non-transitory machine-readable storage medium of claim 17, wherein the operations further comprise:
based on an analysis of the request data, determining a first parameter to handle the request; and
comparing the first parameter to second parameters associated with the resources.

20. The network device of claim 19, wherein the operations further comprise: determining that there is not the matching resource of the resources that is able to perform the network service based on determining that the second parameters of the resources does not satisfy a matching criterion associated with the first parameter.

* * * * *